UNITED STATES PATENT OFFICE.

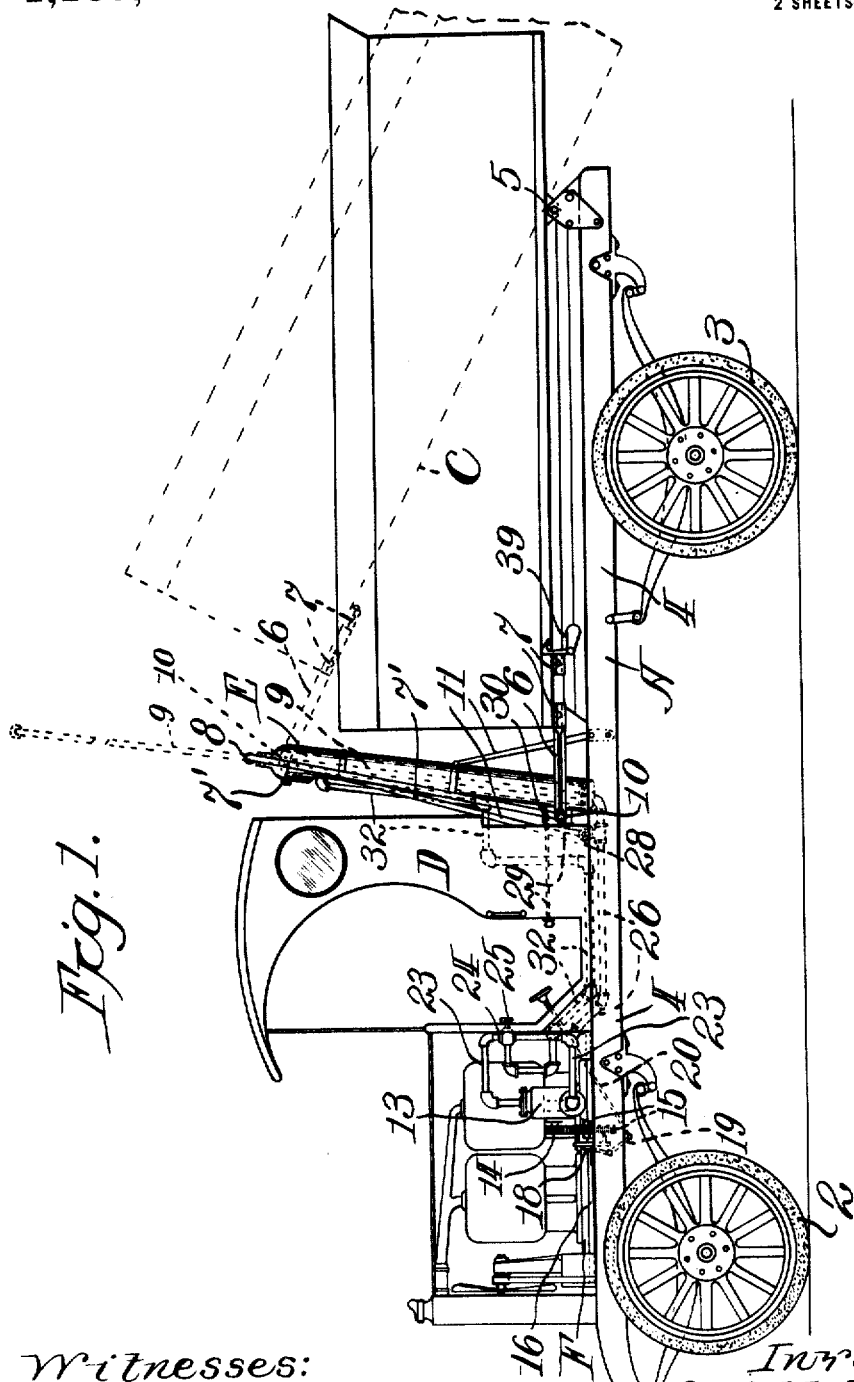

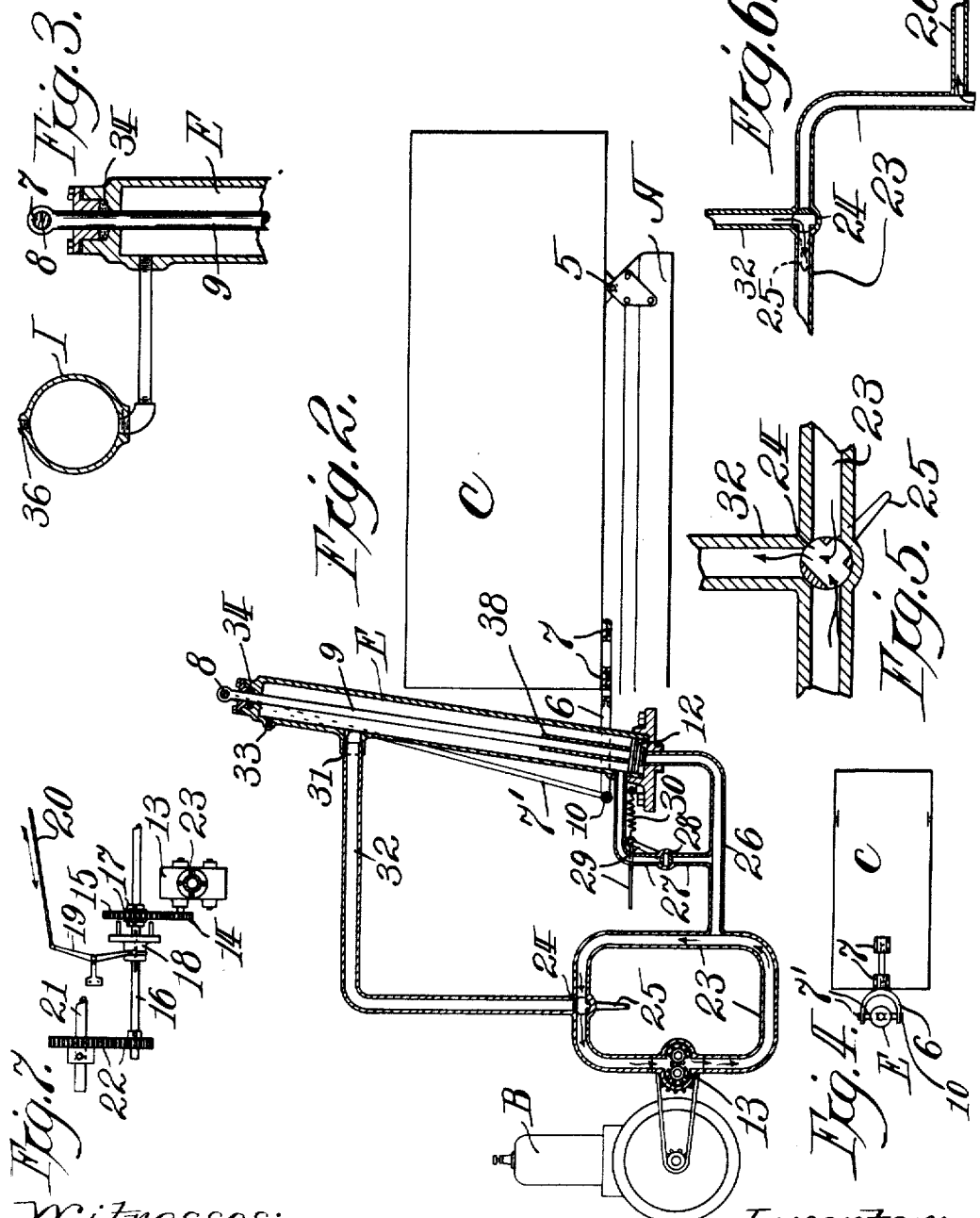

GARFIELD A. WOOD, OF ST. PAUL, MINNESOTA, ASSIGNOR OF ONE-HALF TO GRANT WALDREF, OF ST. PAUL, MINNESOTA.

HYDRAULIC DUMP.

1,165,825.　　　Specification of Letters Patent.　　Patented Dec. 28, 1915.

Application filed October 21, 1912. Serial No. 726,829.

*To all whom it may concern:*

Be it known that I, GARFIELD A. WOOD, a citizen of the United States, residing at St. Paul, in the county of Ramsey and State of Minnesota, have invented a new and useful Improvement in Hydraulic Dumps, of which the following is a specification.

The object of this invention is to provide a simple and effective apparatus for tilting the body of an automobile truck for the purpose of quickly dumping the contents of the body.

More particularly this invention comprises a hydraulic ram operably connected with the body of the truck to lift one end thereof, said ram being actuated through power derived from the engine which is employed to propel the truck.

This invention further comprises features of construction and combinations of parts which will be hereinafter more particularly described and claimed.

In the accompanying drawings forming part of this specification, Figure 1 is a side elevation of an automobile truck showing my invention applied thereto; Fig. 2 is a diagrammatic view of my improved apparatus, and Figs. 3, 4, 5, 6 and 7 are views of details, part of which are illustrated in section.

In the drawings A indicates an automobile truck of ordinary construction having front wheels 2 and drive wheels 3. The engine B is mounted on the frame 4 in the usual manner and the carrying body C is hinged at 5 near the rear of the frame 4. The forward end of the body C normally rests on the frame 4, and an arm 6 is freely journaled centrally on the bottom of the body in supports 7. The arm 6 is bifurcated on its free ends to extend on either side of a hydraulic cylinder E which is supported by the frame 4 in any suitable manner just back of the driver's cab D.

A yoke 7' which is pivoted at 8 to the piston rod 9 of the cylinder E and extends downward on either side of the cylinder, is pivotally connected at 10 to the bifurcated ends of the arm 6. The cylinder E is shown in inclined position which is merely for convenience, it being obvious that it may be set vertical if so desired. As illustrated in Fig. 1, braces 11 assist in holding the cylinder E in position.

The piston 12 is connected to the piston rod 9 in the usual manner and normally is in the position illustrated in Fig. 2. A rotary gear pump 13 of ordinary design is mounted on the engine frame F and is operated by gears 14 and 15, the gear 15 being freely journaled on a counter shaft 16 between collars 17. An ordinary dog clutch 18 is slidably keyed to the counter shaft 16 and is thrown in and out of gear with the gear 15 by the lever 19 and foot lever 20 which is operated by the driver of the truck when desired.

The shaft 16 is connected with the engine shaft 21 by gears 22 as illustrated in Fig. 7 or in any other suitable manner. Piping forming a loop 23 is connected to either side of the gear pump 13 and a suitable valve 24 is inserted in said loop so that it can be easily operated by the driver of the truck by a lever or handle 25.

The cylinder E is connected at its lower extremity to the loop 23 by pipe 26, and a by-pass pipe 27 which is closed by the valve 28. The valve 28 is operated by levers 29 and a spring 30 which normally holds the valve 28 in a closed position. Near the upper end of the cylinder E is a port 31 which is connected to the valve 24 by pipe 32. The cylinder E and its connecting pipes together with the gear pump are adapted to be filled with heavy oil or glycerin and oil through the port 33 at the top of the cylinder E, a small space being left in the top of the cylinder for the expansion of the liquid.

In operation when it is desired to dump the contents of the body C the operator throws the clutch 18 by means of the levers 19 and 20 into connection with the gear 15 which operates the gear pump 13 by the engine B and the valve 24 is turned into the position illustrated in Fig. 6 directing the flow of liquid to the piston through the pipe 26 causing it to rise, in the cylinder E and at the same time elevating the forward end of the body C by means of the yoke 7' and connecting arm 6. When the piston reaches a point just above the port 31 it will stop automatically and the liquid will flow out through the port 31, pipe 32 and valve 24 to the gear pump 13 and continue through loop 23 and pipe 26 to the cylinder E thus holding the piston 12 in elevated position making an automatic safety arrangement so that the operator or driver can start the pump 13 and then go back to the rear of the truck and open the body C to allow the contents to empty while the body is elevating without any attention to the elevating parts. If it is desired to stop the pump 13 and hold the piston 12 and body C in elevated position the operator turns the valve 24 into the position illustrated in Fig. 2 stopping the flow of liquid which holds the piston in the desired position. When it is desired to lower the piston 12 and body C the valve 24 is turned into the position illustrated in Fig. 5 and the gear pump may or may not be used as the weight of the body is sufficient to force the liquid to the other side of the piston, the liquid forming a cushion for the descending body, which prevents any impact between the body and frame. A packing 34 can be used around the piston rod 9 at the top of the cylinder to prevent any leakage of liquid. In elevating the piston 12 if air gets into the gear pump 13 it will not produce a strong enough flow of liquid to start the piston up, the operator then opens the valve 28 by the levers 29 which open the by-pass 27 and allows the liquid to short circuit through the cylinder around the piston. The air will then rise to the top of the cylinder where it will be separated from the oil. The valve 28 is then closed and the piston 12 elevated.

The gear pump 13 is adapted to be operated continually by the engine B by leaving the valve 24 in the position illustrated in Fig. 2 the liquid circulating around the loop 23. An important feature of my invention is that when the body C is elevated to the extreme dumping position the connections 10 are in line with the center of the cylinder E, thus preventing any lateral strain on the piston rod 9, which at this point is almost fully extended out of the cylinder E. It will also be noted that the free journaling of the arm 6 in the bearings 7 allows for the compensating motion of the body C in tilting as would be true when the rear wheels of the truck are not on the same level. This also prevents any strain on the piston rod 9 when the same is elevated.

It will be noted that the port 31 must be larger than the thickness of the piston 12, so that when the piston reaches the port 31 in the course of elevating it will not close the port 31 and lock the liquid in the top of the cylinder E which would prevent the return of the piston. To limit the elevating movement of the piston, a stop in the form of a sleeve 38 is placed on the rod 9, and thus it will be possible to operate the piston in either direction at all times. In Fig. 3 is illustrated a detail showing an alternative construction where an expansion tank I is connected to the cylinder E and which has an opening 36 for filling the same.

The cylinder E in Fig. 2, has a plug 33 closing an opening in which the connection with tank I is adapted to be secured. Any form of prime mover in place of the engine B may be employed for driving the equivalent of the pump 13, and any form of impelling medium such as oil, water and other liquid, gas or air may be used.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A self propelled vehicle having a motor, a tiltable body mounted upon said vehicle, a cylinder, a piston in said cylinder having its rod projecting upwardly through said cylinder, a pump operated by said motor and connected with said cylinder to operate said piston, a link swung from the upper end of said rod and adapted to swing longitudinally, and a connection pivoted to the lower end of said link and journaled on said body to compensate for transverse motion of said body as regards said piston when said rod is in extended position.

2. A self propelled vehicle having a propelling motor, a dumping body tiltingly mounted on said vehicle, a pump mounted on said vehicle, means for throwing said pump into and out of gear with said motor to operate said pump, a hydraulic cylinder mounted on said vehicle having a piston which is connected to said dumping body, a system of piping connecting said pump with said cylinder, a valve in said system of piping adapted to direct the flow of liquid therein to operate said piston to tilt said body, means for automatically stopping the upward movement of said piston while said liquid continues to flow through said cylinder and while said motor and pump are operating and means for releasing air from said piping into said cylinder above said piston.

3. A self propelled vehicle having a propelling motor, a dumping body tiltingly mounted on said vehicle, a pump connected to said motor, a hydraulic cylinder having its piston operatively connected to said body, a system of piping connecting said pump with said cylinder, a valve adapted to direct the flow of liquid in said system of piping and cylinder and a second valve adapted to direct the flow of liquid through said piping and cylinder without operating said piston.

4. A self propelled vehicle having a propelling motor, a dumping body tiltingly mounted on said vehicle, a pump connected with said motor, a cylinder having its piston operatively connected to said body, a circuit of piping connecting said pump with said cylinder, a valve adapted to direct the flow of liquid in said system of piping and cylinder, and a valved branch passage adapted to direct the flow of liquid through said piping and cylinder without operating said piston, whereby air is released from the pump and piping system.

5. A self propelled vehicle having a propelling motor, a dumping body tiltingly mounted on said vehicle, a pump connected with said motor, an upwardly extending cylinder having its piston operatively connected to said body, and a system of passages connecting the ingress and egress openings of said pump with the upper and lower ends of said cylinder, said piston being adapted to partly overlap the upper connection of said passages thereby forming a duct around said piston.

6. A self propelled vehicle having a propelling motor, a dumping body hinged on said vehicle, a pump mounted on said vehicle, means for throwing said pump into and out of gear with said motor to operate said pump, a hydraulic cylinder mounted on said vehicle having a piston rod which is movably connected to said body, a pipe connection between said pump and said cylinder, and a by-pass associated with said cylinder and said pipe connection to permit the escape of air from and the proper working of said parts.

7. A self propelled vehicle having a propelling motor, a dumping body hinged on said vehicle, a gear pump mounted on said vehicle, means for throwing said pump into and out of driving connection with said motor to operate said pump, a hydraulic cylinder mounted on said vehicle provided with a piston rod having a compensating connection with the free portion of said body, a system of piping having valved passages connecting said gear pump with said cylinder, a loop in said piping connecting the intake and outlet of said gear pump, a valve interposed in said loop adapted in one position to direct the flow of liquid in said system of piping and cylinder to elevate said piston, in another position to hold said piston in elevated position and in another position to allow said piston to descend to normal position during the operation of said pump.

8. A self propelled vehicle having a propelling motor, a tiltable body hinged on said vehicle, a gear pump mounted on said vehicle, means for throwing said pump into and out of connection with said motor to operate said pump, a hydraulic cylinder mounted on said vehicle, having a piston rod which is movably connected to said tiltable body to operate the same, a system of piping having valved passages connecting said gear pump with said cylinder, a continuous loop in said piping system, said gear pump forming part of said loop, a valve interposed in said loop for controlling the operation of said piston, and a by-pass adapted to direct the flow of liquid through said pipe system and around said piston in said cylinder to release air in said pump and liquid.

9. A motor vehicle having a frame, a body pivotally mounted at one end upon said frame, a pump connected to the motor of said vehicle, a hydraulic cylinder disposed adjacent the free end of said body having a piston with its rod projecting upwardly, a pair of compensating connections secured at one of their extremities to and on opposite sides of the upper end of said rod and at their other extremities to the free end of said body to permit free movement between said body and cylinder in a substantially vertical longitudinal plane, a system of piping connecting said pump with said cylinder, means for allowing said pump to operate continuously with said motor and means for circulating the liquid in said system of piping and cylinder independent of the operation of said piston.

10. A self propelled vehicle having a motor, a tiltable body mounted upon said vehicle, a cylinder, a piston in said cylinder having its rod projecting upwardly through said cylinder, a pump operated by said motor and connected with said cylinder to operate said piston, a carrying element supported by said rod and adapted to move longitudinally and a supporting element movably connected to said carrying element to permit of longitudinal movement of said parts and movably mounted on said body to compensate for transverse motion of said body as regards said piston.

11. A self propelled vehicle having a propelling motor, a dumping body tiltingly mounted on said vehicle, a pump connected to said motor, a hydraulic cylinder having its piston operatively connected to said body, a system of piping connecting said pump with said cylinder, a valve adapted to direct the flow of liquid in said system of piping and cylinder, a second valve adapted to direct the flow of liquid through said piping and cylinder without operating said piston and tension means for impelling said second valve into normally closed position.

12. A self propelled vehicle having a propelling motor, a dumping body tiltingly mounted on said vehicle, a pump connected to said motor, a hydraulic cylinder interposed between said pump and body and having its piston operatively connected to said body, a system of piping connecting said pump with said cylinder and means for establishing communication between the portions of said cylinder above and below said piston and with said piping to prevent the piston locking in said cylinder.

13. A vehicle having a supporting frame, a body pivotally mounted adjacent one end on said frame to tip, a hoist having a cylinder mounted on said frame and extending upwardly beyond the line of travel of the other end of said body, a piston reciprocable in said cylinder having a rod projecting upwardly, a free connection between the upper end of said rod and said other end of said body adapted to compensate for uneven motion between said rod and body, a pump operatively connected with said cylinder adapted to impel a medium in said cylinder to force said piston upwardly and raise said body and means for operating said pump.

14. A vehicle having a dumping body pivotally mounted thereon, means for raising said body relatively to said vehicle comprising a fluid pressure operated mechanism, and means for maintaining a circulation of fluid through said raising mechanism when said body is in either elevated or lowered position.

15. A motor driven vehicle having a dumping body pivotally mounted thereon, a fluid pressure operated piston for elevating the body against the action of gravity, means for automatically limiting the height of elevation of said piston, means for maintaining a circulation of fluid through said cylinder for retaining said piston in elevated position, and means for reversing and permitting an acceleration of the fluid flow through said cylinder to increase the speed of return of said piston to normal position.

16. A vehicle having a dumping body pivotally mounted thereon, a pump, a motor for driving said pump, a cylinder having a piston and piston rod operatively connected with said body, connections between said pump and said cylinder, said connections including a two-point inlet into and an outlet from said cylinder, and means for maintaining a circulation of fluid through either of said inlets, said cylinder, outlet and pump.

In testimony whereof, I have signed my name to this specification, in the presence of two subscribing witnesses.

GARFIELD A. WOOD.

Witnesses:
H. L. FISCHER,
G. H. DUBACH.

DISCLAIMER 1,165,825.—*Garfield A. Wood,* St. Paul, Minn. HYDRAULIC DUMP. Patent dated December 28, 1915. Disclaimer filed July 8, 1931, by the assignees, *Wood Corporation of Delaware,* and *Wood Hydraulic Hoist & Body Company.*

Hereby make disclaimer to that part of the specification reading as follows:

"Any form of prime mover in place of the engine B may be employed for driving the equivalent of the pump 13 and any form of impelling medium such as oil, water and other liquid, gas or air may be used."

Your petitioners further with respect to claim 5 of said Letters Patent No. 1,165,825 hereby make disclaimer with respect to the improvements described and defined in said claim 5 of so much thereof as is in excess of the following:

"A self-propelling vehicle having a propelling motor, a dumping body tiltably mounted on said vehicle adjacent the rear end of the vehicle, a gear pump connected with said motor an upwardly extending cylinder having its piston operatively connected to said body, and a system of passages connecting the ingress and egress openings of said gear pump with the upper and lower ends of said cylinder, said piston being adapted to partly overlap the upper connection of said passages thereby forming a duct around the piston."

Your petitioners further hereby make disclaimer with respect to the improvement described and defined in claim 12 of said Patent No. 1,165,825, of so much thereof as is in excess of the following:

"A self-propelled vehicle having a propelling motor, a dumping body tiltingly mounted on said vehicle adjacent the rear end of the vehicle, a gear pump connected to said motor, a hydraulic cylinder interposed between said gear pump and body and having its piston operatively connected to said body, a system of piping connecting said gear pump with said cylinder and means for establishing communication between the portions of said cylinder above and below said piston and with said piping to prevent the piston locking in said cylinder."

*(Official Gazette August 4, 1931.)*